US008475746B2

(12) United States Patent
Chung et al.

(10) Patent No.: US 8,475,746 B2
(45) Date of Patent: Jul. 2, 2013

(54) URANIUM ION EXCHANGE ADSORPTION METHOD USING ULTRASOUND

(75) Inventors: Kyeong-Woo Chung, Daejeon (KR); Chul-Joo Kim, Daejeon (KR); Ho-Sung Yoon, Seoul (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 24 days.

(21) Appl. No.: 13/099,088

(22) Filed: May 2, 2011

(65) Prior Publication Data

US 2012/0134900 A1 May 31, 2012

(30) Foreign Application Priority Data

Nov. 26, 2010 (KR) ........................ 10-2010-0119088

(51) Int. Cl.
*C01G 56/00* (2006.01)
*C22B 60/02* (2006.01)

(52) U.S. Cl.
USPC ...................................... 423/6; 423/7; 423/20

(58) Field of Classification Search
USPC .................................................... 423/6, 7, 20
See application file for complete search history.

(56) References Cited

U.S. PATENT DOCUMENTS

| | | | | |
|---|---|---|---|---|
| 4,185,077 | A * | 1/1980 | Albright | 423/7 |
| 4,368,175 | A * | 1/1983 | Miyake et al. | 423/7 |
| 8,021,959 | B2 * | 9/2011 | Tauzin | 438/455 |
| 2003/0183043 | A1 * | 10/2003 | Wai et al. | 75/398 |

FOREIGN PATENT DOCUMENTS

| | | | | |
|---|---|---|---|---|
| JP | 6-339615 | A | | 12/1994 |
| JP | 07031974 | A | * | 2/1995 |
| JP | 08257030 | A | * | 10/1996 |
| JP | 2000-235098 | A | | 8/2000 |
| JP | 2006-317290 | A | | 11/2006 |
| KR | 1019830010210 | A | | 12/1983 |
| KR | 100382996 | B1 | | 5/2003 |
| KR | 1020090061001 | A | | 6/2009 |
| RO | 122642 | B1 | * | 10/2009 |

OTHER PUBLICATIONS

"The 6th International Conference on Separation Science and Technology", Oct. 26-28, 2010, pp. 1-6, Changsha, Hunan, China.

Ho-Sung Yoon et al., "The effect of Sonication Intensity on the Leaching of low-grade Uranium Ore", 6th ICSST, Oct. 27, 2010, Korea Institute of Geoscience & Mineral Resources, Changsha, Hunan, China.

Kyeong Woo Chung et al., "Uranium adsorption behavior on anionic exchange resin under ultrasound application", 6th ICSST, Oct. 27, 2010, Korea Institute of Geoscience & Mineral Resources, Changsha, Hunan, China.

* cited by examiner

*Primary Examiner* — Melissa Stalder

(57) ABSTRACT

Disclosed herein is a uranium ion exchange adsorption method using ultrasound. The method includes placing a slurry obtained by mixing uranium ions, sulfuric acid and an ion exchange resin into a reaction bath, and stirring the slurry in the reaction bath while simultaneously applying ultrasound to the reaction bath to allow the uranium ions to be adsorbed to the ion exchange resin through ion exchange adsorption. The method has an improved ion exchange adsorption rate of the uranium ions.

3 Claims, 2 Drawing Sheets

URANIUM ION EXCHANGE ADSORPTION METHOD USING ULTRASOUND

CROSS-REFERENCE TO RELATED APPLICATIONS

This application claims priority to and the benefit of Korean Patent Application No. 10-2010-0119088 filed on Nov. 26, 2010, the contents and teachings of which are hereby incorporated by reference in their entirety.

BACKGROUND

1. Technical Field

The present invention relate to a uranium ion exchange adsorption method and, more particularly, to a uranium ion exchange adsorption method using ultrasound, in which ultrasound is applied to a slurry obtained by mixing uranium ions, sulfuric acid and an ion exchange resin while stirring the slurry, thereby improving an ion exchange adsorption rate of the uranium ion.

2. Description of the Related Art

Generally, uranium extracted from uranium ore through leaching is subjected to a refinement process through adsorption using an ion exchange resin. In this case, column type uranium leaching is generally performed.

In the column type uranium leaching, a uranium-leached solution is vertically placed in a reaction bath. To this end, a solid/liquid separation process must be performed to separate residues from the leached solution after leaching.

In recent years, as an approach to avoid problems of the column type uranium leaching, resin-in-pulp type uranium leaching was developed, in which a uranium rich slurry is prepared from uranium ore material through uranium leaching and is subjected to direct adsorption using an ion exchange resin, instead of indirectly absorbing uranium from the leached solution which is clear and enriched with uranium.

In this resin-in-pulp type uranium leaching, however, since uranium ion exchange adsorption is carried out by very slowly stirring the slurry including the uranium leached solution and the ion exchange resin for about a few dozen to hundreds of hours in the reaction bath to obtain suitable mixing of the slurry, the uranium ion exchange adsorption takes too much time, causing a very low adsorption rate.

BRIEF SUMMARY

One aspect of the present invention is to provide a uranium ion exchange adsorption method using ultrasound, in which a slurry obtained by mixing uranium ions, sulfuric acid and an ion exchange resin is stirred to allow the uranium ions to be adsorbed to the ion exchange resin through ion exchange adsorption while applying ultrasound to the slurry to increase an ion exchange adsorption rate of uranium during ion exchange adsorption.

Another aspect of the present invention is to provide a uranium ion exchange adsorption method using ultrasound waves, in which a slurry obtained by mixing uranium ions, sulfuric acid and an ion exchange resin is placed in a reaction bath and then stirred while simultaneously applying ultrasound to the reaction bath to allow the uranium ions to be adsorbed to the ion exchange resin through ion exchange adsorption, thereby increasing an ion exchange adsorption rate of uranium.

In accordance with one embodiment of the invention, a uranium ion exchange adsorption method using ultrasound includes: stirring a slurry obtained by mixing uranium ions, sulfuric acid and an ion exchange resin to allow the uranium ions to be adsorbed to the ion exchange resin through ion exchange adsorption while applying ultrasound during the ion exchange adsorption.

The ion exchange resin may be one selected from porous synthetic resins including a strongly basic anion exchange resin and a weakly basic anion exchange resin.

The ion exchange resin may be added to the slurry in an amount of 3 to 8 g/l.

During ion exchange adsorption, the slurry may be stirred at a temperature of 20 to 40° C.

During ion exchange adsorption, the slurry may be adjusted to have a pH of 2 to 6.

The pH of the slurry may be adjusted using the sulfuric acid.

The slurry may be stirred at a rate of 200 to 450 rpm.

The ultrasound may be applied at an output power of 10 to 90 W.

In accordance with another embodiment of the invention, a uranium ion exchange adsorption method using ultrasound waves includes: placing a slurry obtained by mixing uranium ions, sulfuric acid and an ion exchange resin in a reaction bath; and stirring the slurry while simultaneously applying ultrasound to the reaction bath to allow the uranium ions to be adsorbed to the ion exchange resin.

The ion exchange resin may be one selected from porous synthetic resins including a strongly basic anion exchange resin and a weakly basic anion exchange resin.

The ion exchange resin may be added to the slurry in an amount of 3 to 8 g/l.

During the ion exchange adsorption, the slurry may be stirred at a temperature of 20 to 40° C.

During ion exchange adsorption, the slurry may be adjusted to have a pH of 2 to 6.

The pH of the slurry may be adjusted using the sulfuric acid.

The slurry mixture may be stirred at a rate of 200 to 450 rpm.

The ultrasound may be applied at an output power of 10 to 90 W.

The application of ultrasound may be performed using an ultrasonicator with a tip of the ultrasonicator inserted into a bath container surrounding the reaction bath.

BRIEF DESCRIPTION OF THE DRAWINGS

The above and other aspects, features and advantages of the invention will become apparent from the following description of exemplary embodiments given in conjunction with the accompanying drawings, in which.

DETAILED DESCRIPTION

Figure 1:
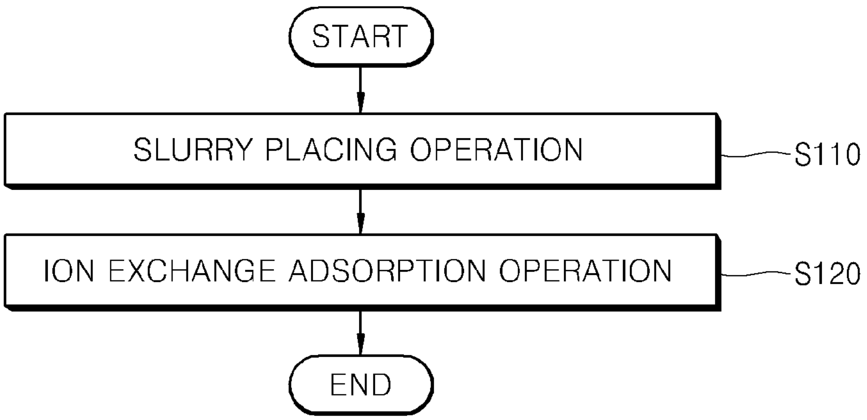
FIG. 1 is a flowchart of a uranium ion exchange adsorption method using ultrasound in accordance with an exemplary embodiment of the present invention.

Exemplary embodiments of the invention will now be described in detail with reference to the accompanying drawings. It should be understood that the present invention is not limited to the following embodiments and may be embodied in different ways, and that the embodiments are given to provide complete disclosure of the invention and to provide thorough understanding of the invention to those skilled in the art. The scope of the invention is limited only by the accompanying claims and equivalents thereof. Like components will be denoted by like reference numerals throughout the specification.

Figure 2:
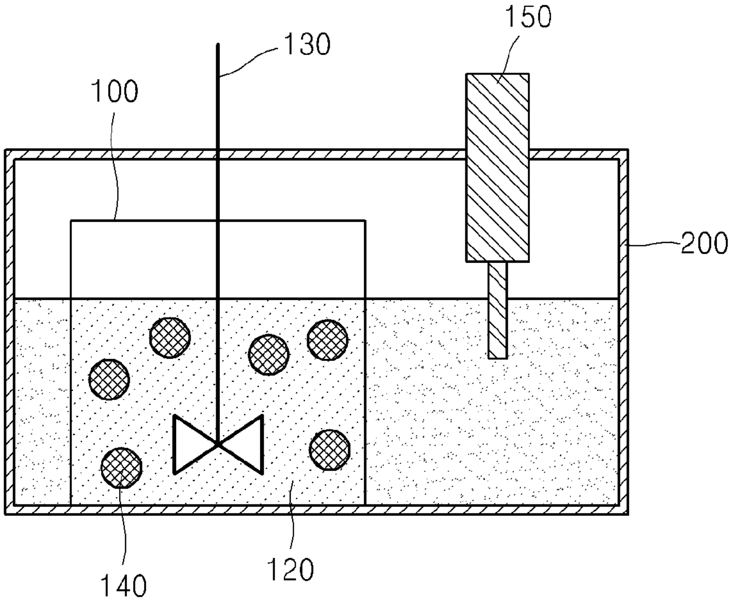
FIG. 2 is a diagram of the uranium ion exchange adsorption method using ultrasound in accordance with the exemplary embodiment of the present invention.

FIG. 1 is a flowchart of a uranium ion exchange adsorption method using ultrasound in accordance with an exemplary embodiment and FIG. 2 is a diagram of the uranium ion exchange adsorption method using ultrasound in accordance with the exemplary embodiment.

Referring to FIGS. 1 and 2, the uranium ion exchange adsorption method using ultrasound according to the embodiment includes a slurry placing operation in S110 and an ion exchange adsorption operation in S120.

Slurry Placing Operation

In the slurry placing operation S110, slurry 120 obtained by mixing uranium ions, sulfuric acid and an ion exchange resin 140 is placed in a reaction bath 100.

The ion exchange resin 140 may be selected from porous synthetic resins including a strongly basic anion exchange resin and a weakly basic anion exchange resin. For example, the porous synthetic resin may be Lanxess MP 600.

The ion exchange resin 140 is a polymer material that is obtained by coupling an ion exchanger to polymer gas having a fine three-dimensional structure and serves to exchange and filter ionic impurities dissolved in a polar or non-polar solution, and can be defined as a synthetic resin in which mobile ions of the ion exchange resin 140 are substituted with other ions in the solution.

In this embodiment, the ion exchange resin 140 may be added to the slurry in an amount of 3 to 8 g/l. If the added amount of ion exchange resin 140 is less than 3 g/l, ion exchange adsorption may be insufficient due to the excessively low amount of ion exchange resin, and if the added amount of ion exchange resin 140 exceeds 8 g/l, there is a problem of an increase in manufacturing costs due to an excessive amount of ion exchange resin.

Ion Exchange Adsorption Operation

In the ion exchange adsorption operation S120, the slurry 120 placed in the reaction bath 100 is stirred while simultaneously applying ultrasound to the reaction bath 120 to allow the uranium ions to be adsorbed to the ion exchange resin 140 through ion exchange adsorption.

Here, pH of the slurry 120 may be adjusted in the range of 2 to 6. At this time, the pH of the slurry 120 may be adjusted by the amount of sulfuric acid added thereto.

Ion exchange adsorption may be performed at a temperature of 20 to 40° C., and the slurry may be stirred at 200 to 350 rpm. As such, the slurry placed in the reaction bath 100 may be stirred by rotating a stirring bar 130 at a stirring rate set to prevent the slurry from flowing out of from the reaction bath 100.

Advantageously, the reaction bath 100 may be disposed inside a bath container 200 such that the bath container 200 surrounds the reaction bath 100. This configuration is designed to prevent the ion exchange resin 120 in the reaction bath 100 from being directly irradiated and damaged by ultrasound during application of ultrasound to the slurry.

Further, reaction with the ion exchange adsorption may be carried out for 0.1 to 3 hours. In this embodiment, reduction in time for the ion exchange adsorption reaction to three hours or less can be achieved by cavitation effects resulting from application of ultrasound to the slurry.

Specifically, in the uranium ion exchange adsorption method according to this embodiment, uranium ions are adsorbed to the ion exchange resin 140 through ion exchange adsorption by stirring the slurry 120 in the reaction bath 100 while simultaneously applying ultrasound to the reaction bath 120.

At this time, the ultrasound may be applied at an output power of 10 to 100 W. If ultrasound is applied at an output power less than 10 W, there is a possibility of insufficient ion exchange adsorption reaction due to insignificant cavitation effects upon application of ultrasound, and if ultrasound is applied at an output power exceeding 100 W, there is a possibility of breakage of the resin.

As such, when ultrasound is continuously applied to the reaction bath 100 during ion exchange adsorption, the ion exchange adsorption rate increases due to increase in frequency of effective collision and improvement of mixing efficiency by cavitation, so that ion exchange adsorption of uranium ions can be maximized, thereby reducing time for the ion exchange adsorption reaction.

In particular, during the ion exchange adsorption reaction, application of ultrasound may be performed using an ultrasonicator 150 with a tip of the ultrasonicator 150 inserted into the bath container 200 which surrounds the reaction bath 100. When ultrasound is applied to the slurry with tip of the ultrasonicator 150 directly inserted into the reaction bath 100, there can be a problem of damage of the ion exchange resin 120. Thus, it is desirable that the tip of the ultrasonicator 150 be inserted into the bath container 200 and located outside the reaction bath 100.

Accordingly, in the uranium ion exchange adsorption method using ultrasound according to the embodiment, the slurry obtained by mixing uranium ions, sulfuric acid and an ion exchange resin is stirred to allow the uranium ions to be adsorbed to the ion exchange resin through ion exchange adsorption and ultrasound is continuously applied to the slurry during the ion exchange adsorption, thereby increasing the ion exchange adsorption rate due to increase in frequency of effective collision and improvement in mixing efficiency by cavitation.

As such, in the method according to the embodiments, the slurry obtained by mixing uranium ions, sulfuric acid and an ion exchange resin is stirred to allow the uranium ions to be adsorbed to the ion exchange resin through ion exchange adsorption while ultrasound are continuously applied to the slurry during ion exchange adsorption, thereby increasing the ion exchange adsorption rate of uranium through increase in frequency of effective collision and improvement in mixing efficiency by cavitation.

Example 1

A slurry was prepared by mixing 106 ppm of uranium ion, 3.6 g/l of an ion exchange resin and sulfuric acid. Here, Lanxess MP 600 was used as the ion exchange resin. Then, ion exchange adsorption was carried out for 1 hour by stirring the slurry at 250 rpm in a reaction bath while applying ultrasound to the reaction bath. During ion exchange adsorption, reaction temperature was maintained at 25° C. and the pH of the slurry was adjusted to 4.0 through addition of sulfuric acid. Further, ultrasound was applied at an output power of 41 W. The ion exchange adsorption reaction was performed for a total of 1 hour and a sample was taken from the reaction bath every 10 minutes. The sample was subjected to inductively coupled plasma (ICP) analysis to determine the remaining amount of uranium and the adsorption rate of the uranium.

Example 2

A slurry was prepared by mixing 106 ppm of uranium ion, 6 g/l of an ion exchange resin and sulfuric acid. Here, Lanxess MP 600 was used as the ion exchange resin. Then, ion exchange adsorption was carried out for 1 hour by stirring the slurry at 250 rpm in a reaction bath while applying ultrasound to the reaction bath. During ion exchange adsorption, reaction temperature was maintained at 25° C. and the pH of the slurry was adjusted to 4.0 by adding sulfuric acid. Further, ultrasound was applied at an output power of 80 W. The ion exchange adsorption reaction was performed for a total of 1 hour and a sample was taken from the reaction bath every 10 minutes. The sample was subjected to ICP analysis to determine the remaining amount of uranium and the adsorption rate of the uranium.

Comparative Example 1

A slurry was prepared by mixing 106 ppm of uranium ion, 3.6 g/l of an ion exchange resin and sulfuric acid. Here, Lanxess MP 600 was used as the ion exchange resin. Then, ion exchange adsorption was carried out for 1 hour by stirring the slurry at 250 rpm without applying ultrasound. During ion exchange adsorption, reaction temperature was maintained at 25° C. and the pH of the slurry was adjusted to 4.0 by adding sulfuric acid without application of ultrasound. The ion exchange adsorption reaction was performed for a total of 1 hour and a sample was taken from the reaction bath every 10 minutes. The sample was subjected to ICP analysis to determine the remaining amount of uranium and the adsorption rate of the uranium.

Figure 3:
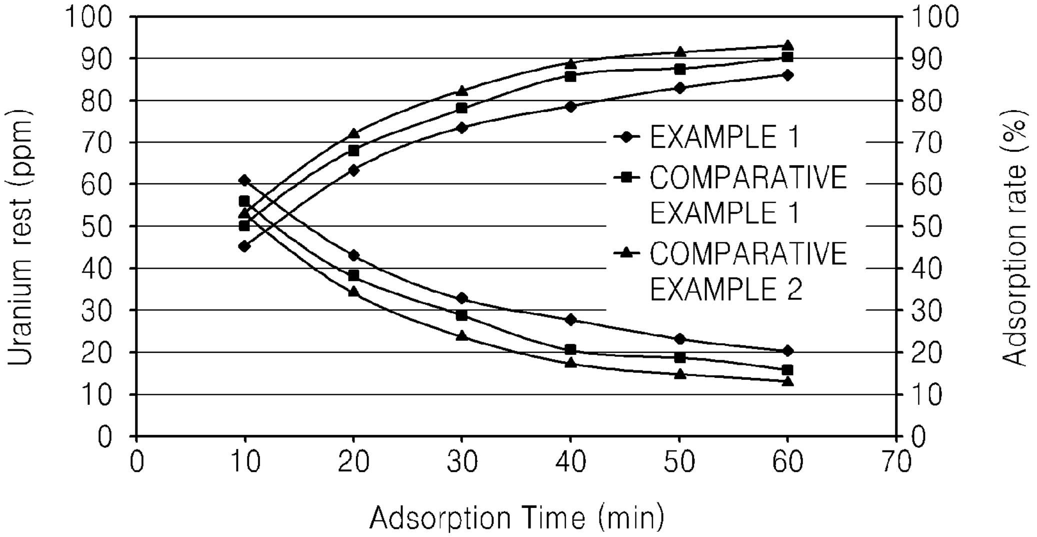
FIG. 3 is a graph depicting remaining uranium amount and adsorption rate with respect to leaching time for Examples 1 and 2 and Comparative Example 1.

FIG. 3 is a graph depicting remaining uranium amount and adsorption rate with respect to leaching time for Examples 1 and 2 and Comparative Example 1.

In FIG. 3, it can be ascertained that Examples 1 and 2 had lowered remaining amounts of uranium after a predetermined adsorption time, as compared with Comparative Example 1. In particular, for Example 2 prepared by adding a relatively high amount of ion exchange resin and applying a relatively high ultrasound output power, the remaining amount of uranium decreased more noticeably than in Example 1.

On the other hand, it can be ascertained that Examples 1 and 2 had increased adsorption rates after a predetermined adsorption time, as compared with Comparative Example 1. In particular, for Example 2 prepared by adding a relatively high amount of ion exchange resin and applying a relatively high ultrasound output power, the adsorption rate increased more noticeably than in Example 1.

At this time, it can be understood that the reduction in the remaining amount of uranium in Examples 1 and 2 is attributed to the fact that ion exchange adsorption was actively carried out by cavitation effects upon application of ultrasound.

According to the above experimental results, it can be seen that application of ultrasound to the slurry results in increase in the uranium ion exchange adsorption rate and uranium adsorption amount, as compared with the case where ultrasound is not applied to the slurry. Further, it can also be seen that the uranium ion exchange adsorption rate increases with increasing amount of the ion exchange resin and ultrasound output power.

Although some embodiments have been described herein, it should be understood by those skilled in the art that these embodiments are given by way of illustration only, and that various modifications, variations, and alterations can be made without departing from the spirit and scope of the invention. Therefore, the scope of the invention should be limited only by the accompanying claims and equivalents thereof.

What is claimed is:

1. A uranium ion exchange adsorption method using ultrasound, comprising:

providing a slurry including uranium ions, sulfuric acid, and an ion exchange resin in a reaction bath, wherein the reaction bath is contained in a bath container; and stirring the slurry in the reaction bath while applying ultrasound to the reaction bath to allow the uranium ions to be adsorbed onto the ion exchange resin through ion exchange adsorption, wherein the slurry is stirred at a temperature of 20 to 40° C. during ion exchange adsorption, wherein the slurry is adjusted to have a pH of 2 to 6 during ion exchange adsorption, wherein the slurry is stirred at a rate of 200 to 450 rpm to prevent the slurry from flowing out of the reaction bath, wherein the ultrasound is applied at an output power of 10 to 90 W, wherein the ultrasound is applied using an ultrasonicator with a tip, and wherein the tip is inserted into the bath container surrounding the reaction bath to prevent the ion exchange resin from being damaged.

2. The method of claim 1, wherein the ion exchange resin is a porous synthetic resin, including any of a strongly basic anion exchange resin and a weakly basic anion exchange resin.

3. The method of claim 1, wherein the ion exchange resin is added to the slurry in an amount of 3 to 8 g/l.

* * * * *